United States Patent [19]

Kafchinski et al.

[11] Patent Number: 5,358,780
[45] Date of Patent: Oct. 25, 1994

[54] BREATHABLE WATER-RESISTANT FABRICS

[75] Inventors: Edward R. Kafchinski, Winfield; Tai-Shung Chung, Randolph; William Timmons, Gladstone; Jeanne Gasman, West Milford, all of N.J.

[73] Assignee: Hoechst Celanese Corp., Somerville, N.J.

[21] Appl. No.: 861,756

[22] Filed: Apr. 1, 1992

[51] Int. Cl.$^5$ .............................. B32B 7/00
[52] U.S. Cl. ................... 428/284; 428/244; 428/248; 428/249; 428/252; 428/265; 428/286; 428/315.5; 428/317.9; 428/421; 428/422; 428/902; 428/913; 428/283
[58] Field of Search .............. 428/421, 422, 315.5, 428/315.7, 315.9, 283, 244, 317.9, 296, 248, 249, 245, 252, 902, 246, 913, 265

[56] References Cited

U.S. PATENT DOCUMENTS

| | | | |
|---|---|---|---|
| 3,929,950 | 12/1975 | Nakamura et al. | 264/49 |
| 4,576,861 | 3/1986 | Kato | 428/315.5 |
| 4,623,670 | 11/1986 | Mutoh et al. | 521/61 |
| 4,702,836 | 10/1987 | Mutoh et al. | 521/61 |
| 4,888,245 | 12/1989 | Witzko | 428/421 |
| 4,910,106 | 3/1990 | Kafchinski et al. | 264/49 |
| 4,946,736 | 8/1990 | Sassa | 428/422 |
| 4,997,603 | 3/1991 | Kafchinski et al. | 264/49 |
| 5,104,727 | 4/1992 | Wnenchak | 428/315.9 |

*Primary Examiner*—James J. Bell
*Attorney, Agent, or Firm*—Joseph M. Mazzarese

[57] ABSTRACT

A breathable water-resistant fabric in which a surface of a fabric material is coated with a microporous layer of ETFE, and a process for making same. An ETFE dope containing a blend of ETFE and a binder polymer is cast or extruded into a film which is subsequently bonded or laminated to the fabric material. The binder is extracted to produce a microporous ETFE layer.

5 Claims, No Drawings

BREATHABLE WATER-RESISTANT FABRICS

BACKGROUND OF THE INVENTION

This invention relates to breathable water-resistant fabrics and a process for making same, especially fabrics laminated with a microporous fluoropolymer, e.g. a microporous poly[ethylene-tetrafluoroethylene] ("ETFE") layer.

ETFE is a copolymer containing approximately equal numbers of ethylenic and tetrafluoroethylenic repeating units primarily linked alternately: $-C_2H_4-C_2F_4-C_2H_4-C_2F_4-$. Its flow temperature is between about 200° C. and about 280° C., depending upon the exact proportion of ethylenic to tetrafluoroethylenic repeating units, and on the molecular weight and structure of the polymer. Commercially available ETFE resin includes HOSTAFLON ® (Hoechst, A. G.).

A fabric that is both water-resistant and breathable (i.e., permits air and water vapor, but not liquid water, to pass through) has obvious advantages for use in clothes and other applications. Polytetrafluoroethylene ("PTFE") has been used to make fabrics of this type, e.g. in GORETEX TM products.

U.S. Pat. No. 3,962,153 issued to Gore describes porous films consisting of highly stretched PTFE; PTFE pellets are melt extruded into films and then the films are stretched. The stretching process imparts porosity to the polymer films, the resulting film structure characterized by having nodes interconnected by fibrils; these films are anisotropic.

U.S. Pat. Nos. 3,679,614 (Shah, et al.), 4,342,636 (Chang, et al.), and 3,661,645 (Strier, et al.) describe other processes for making porous PTFE films.

U.S. Pat. Nos. 4,910,106 and 4,997,603, both issued to Kafchinski, et al., describe the formation of halogenated polymeric microporous membranes having improved strength. These membranes have a very narrow pore size distribution and good temperature and chemical resistance. A polyhalogenated copolymer, such as ETFE, having a very small particle size is blended with a binder polymer using a binder solvent that is a nonsolvent for the copolymer and then a film is formed from the blend; subsequent heat treatment causes the copolymer particles to form a relatively continuous matrix. When the binder is extracted, a microporous film results. The disclosures of these two patents are hereby incorporated by reference herein.

U.S. Pat. No. 3,929,950 issued to Nakamura, et al., describes a method for forming a porous synthetic resin film using a stretching technique. The resin may be, for example, ETFE, PTFE and the like.

U.S. Pat. Nos. 4,623,670 and 4,702,836 both issued to Mutoh, et al., describe a porous membrane made of a fluorinated polymeric resin such a ETFE having a uniform porous structure and good properties. A chlorotrifluoroethylene oligomer must be used with the polymeric resin to form a microporous film by the disclosed method.

SUMMARY OF THE INVENTION

The present invention comprises a breathable water-resistant fabric comprising a fabric material coated on at least one surface with a microporous layer of ETFE, and a process for making same. In this process, a dope containing ETFE particles and an extractable binder, is cast or extruded into a film which is subsequently bonded or laminated onto said fabric material; the binder is then extracted to produce a microporous ETFE layer. Alternatively, the binder may be extracted prior to lamination; the microporous ETFE layer would then be laminated onto the fabric using a suitable adhesive.

It is an object of the present invention to provide a method for making a breathable water-resistant fabric.

It is another object of the invention to provide a breathable water-resistant fabric.

It is yet another object of the present invention to provide a fire resistant fabric that is breathable.

It is a further object of this invention to provide a method for putting a microporous layer of ETFE on fabric.

It is an additional object of the present invention to provide a method for reinforcing ETFE membranes by bonding to a fabric or other substrate material.

These and other objects of the present invention will be apparent to those skilled in the art from the following detailed description and the appended Claims.

DETAILED DESCRIPTION OF THE PREFERRED EMBODIMENT

In one preferred embodiment according to the present invention, a dispersion of fine ETFE particles in a solvent, e.g. methylene chloride, and a solution of a polymeric (e.g. polycarbonate) binder resin in the same solvent are intimately mixed under high shear to form a uniform ETFE suspension in polymeric dope. This ETFE-containing dope is cast into a film and dried until substantially all the solvent has evaporated.

The dried film is then heat treated by calendering at a temperature at or above the flow temperature of the ETFE, e.g., about 300° C. The film is laminated onto a fabric by laying the film on the fabric surface and feeding the two materials into heated calender rolls so that the film is pressed into the fabric surface to form a bond. Preferably, the two materials are sandwiched between protective layers of material, e.g., Kapton TM film, or the like, during the lamination process.

Following lamination, the binder polymer is extracted using methylene chloride, or another suitable solvent that is able to extract the binder resin without dissolving or destroying the ETFE matrix or the fabric, resulting in a fabric having a microporous ETFE layer on one surface. The extraction may be carried out by conventional means; it is desirable that substantially all of the binder is removed, i.e., at least about 95% and preferably more than 98% extracted. Those skilled in the art will be able to determine those methods that are suitable.

In some cases, direct lamination of the dry cast (and preferably calendered) ETFE/binder film onto the fabric substrate provides a sufficiently strong bond. However, some fabrics may not bond well with the ETFE. Therefore, it may be desirable to use an adhesive between the fabric and the ETFE to provide a stronger bond. One preferred method is to calender the film and extract the binder and then to place an adhesive sheet between the fabric and the ETFE film during the lamination process, e.g., a sheet of melt adhesive polyamide web (such as type SH-240 0.6 oz/yd$^2$ purchased from Sharnet Co.) The optimal adhesive will depend upon the fabric composition. Those skilled in the art will be able to determine a suitable adhesive, where needed, for a given fabric. Fabrics to which the ETFE strongly adheres without adhesive include PBI, Nomex ™, Kevlar ™, and other like materials that will not degrade during the bonding process.

Preferred classes of binders include polycarbonate (e.g., MAKROLON ® sold by Mobay Corporation), polysulfone, polyethyloxazoline (e.g., the PEOX ™ polymers sold by Dow Chemical Co.), polyethersulfone, polymethylmethacrylate, polyimide and cellulose acetate. In principle, any polymer that dissolves in a suitable solvent and is immiscible with ETFE in the melt phase might be used as a binder. However, water soluble polyethyloxazoline, cellulose acetate, or other water soluble polymers are most preferred because they can be extracted by submersion in a water bath, a procedure that is inexpensive and does not damage the fabric. Those skilled in the art will be able to identify suitable binders without undue experimentation.

(PEOX ™ polymers come in different viscosity grades, depending on molecular weight. PEOX 50 is low molecular weight polyethyloxazoline (solution viscosity=10 cps in 10% aq. sol. at 25° C., melt viscosity=2,300 poise), PEOX 500 is high m.w. (100 cps, 16,000 poise), and PEOX 200 is intermediate m.w. (40 cps, 5,800 poise).)

Suitable solvents are those that are able to dissolve the binder but not dissolve or damage the fabric or ETFE. Preferred solvents are easily evaporated, e.g. acetone, methylene chloride, water, and the like.

Although the simplest case has been described, i.e. one layer of ETFE bonded to one surface of a fabric, multiple layers may be made in essentially the same way. For instance, a microporous layer of ETFE may be applied to each of two opposite surfaces of a material, or one ETFE layer may be sandwiched between two fabric layers, or several alternating layers of ETFE and fabric may be laminated together. Where more than one sheet of fabric is used, these fabric layers need not all be the same material.

The fabric material must be capable of withstanding the heat and pressure needed to make the film flow into the fabric's pores. A preferred fabric material is woven polybenzimidazole ("PBI"). The preferred polybenzimidazole is poly[2,2'-(m-phenylene)-5,5'-bibenzimidazole], which is commercially available from the Hoechst Celanese Corporation (Charlotte, N.C.). Since this fabric is fire resistant, the resulting laminated fabric will be fire resistant and water-resistant, yet breathable. Other preferred fabric substrates include those made of Kevlar ™, Nomex ™, and PBI blends of these materials.

The ETFE dispersion may be made from an aqueous dispersion (12-30% solids by weight) of an approximately equimolar ethylene-tetrafluoroethylene copolymer manufactured by Hoechst, A. G. (Germany) under the trade name HOSTAFLON ®, or an equivalent composition. The fine ETFE particles may be separated from this aqueous dispersion by adding a solvent that dilutes the suspended solids, centrifuging, and decanting off the mixed liquor. By repeating this process several times, the suspension is transformed from an aqueous dispersion to a non-aqueous dispersion. For example, the aqueous ETFE dispersion may be washed in this manner with acetone where polyethyloxazoline is the binder polymer. Alternately, the ETFE may be washed and dispersed in methylene chloride. This procedure is described in detail in U.S. Pat. No. 4,997,603.

Other sources of ETFE may be used, including similar dispersions having a different solids concentration. For example, ETFE powder may be used to form a dispersion in a suitable binder solvent that is a non-solvent for ETFE. Those skilled in the art will know how to convert commercially available ETFE dispersions, powders, and the like, into the desired form for blending with a binder solution.

The ETFE should have a molecular weight of at least about 10,000, preferably 50,000 or more, and should comprise microparticulates having an average diameter of no more than about 2.0 microns, preferably less than about 1.0 microns, and most preferably less than about 0.5 microns.

The percentage of ETFE dispersed in a polymeric binder dope is suitably between about 10% and about 50% ETFE particles by weight, preferably about 15-35%.

The ETFE-binder blends of this invention have a solids content comprising about 35%-75% (preferably about 50%-70%) by weight ETFE and about 25%-65% (preferably 30%-50%) by weight binder. A blend in which the solids are about 60-70% ETFE (about 40-30% binder) is particularly preferred. The blends may be cast or extruded into film, and the film dried, by any suitable means known in the art; however, the drying temperature must be well below the flow temperature of either polymer, e.g., preferably at least about 25°-50° C. below. If the solids content of the ETFE-binder blend is more than about 65% binder, the resulting membrane may be too porous, whereas a solids content that is less than about 25% binder may result in a flaky film. The microporous films of the present invention have porosities up to about 65%, preferably about 30-60%, and most preferably about 45-55%.

The exact solids content of the ETFE dispersion, the binder solution, and the ETFE-containing dope/blend are not critical, provided that the dispersion and solution are able to be thoroughly blended and formed into a relatively uniform film having sufficient structural integrity to survive the process of this invention.

Although this invention has been described in terms of fabric substrates, the same process can be used to laminate these ETFE films onto other suitable substrate materials, e.g. woven wire mesh screen, fiberglass, asbestos, and the like.

The following non-limiting Examples illustrate selected embodiments of the present invention.

EXAMPLE I

Acetone was added to an aqueous ETFE dispersion containing 19.5% ETFE and a minor amount of surfactant, the mixture was centrifuged for three minutes, and the water-surfactant layer was poured off. This procedure was repeated five times. The result was an ETFE suspension in acetone.

The ETFE-acetone suspension was mixed with PEOX 200 to create three separate mixtures each containing 34% solids; one had an ETFE/PEOX weight ratio of 60/40, the second a ratio of 70/30, and the third was 50/50. To insure uniformity, the mixtures were emulsified at high speed for five minutes and then filtered to remove any lumps. The emulsified mixtures were cast on silicone release paper and allowed to dry, leaving ETFE/PEOX films.

The films were calendered at 300° C. and 2000-3000 psi at a roll speed of 0.7 m/sec, and then placed in water to dissolve (extract) the PEOX binder, producing a microporous ETFE film. During extraction the water was changed every five minutes; each film was soaked for a total of ten minutes at about 21° C. These films were dried in a convection oven at 40° C. and Gurley measurements were then taken to determine porosity and resistance to air penetration. Table I shows the film thickness and Gurley number for each film. These Gurley measurements were performed in a Gurley Densometer Model 4120 (capacity=30 cm$^3$ of air) using one square inch of film.

TABLE I

| ETFE/PEOX ratio | Thickness (mil) | Gurley (sec) |
| --- | --- | --- |
| 70/30 | 2.0 | 1.6 |
| 60/40 | 4.2 | 1.0 |
| 50/50 | 3.6 | 0.09 |

EXAMPLE II

For comparison, two ETFE/PEOX cast films were made according to the procedure of Ex. I, one from PEOX 200 and the other from PEOX 500. The films each had a 60/40 ETFE/PEOX ratio. These cast films were heated for five seconds at 310° C. and then calendered at that temperature. The PEOX binder was extracted and dried as in Ex. I to make a microporous ETFE film.

Water was dropped on the ETFE films and both were found to be water resistant. The Gurley number (measured as in Ex. I), and the thickness both before and after calendering, of each film are shown in Table II. The lower molecular weight binder appears to produce a more porous ETFE film.

TABLE II

| Binder used | Thickness (mil) | | Gurley (sec) |
| --- | --- | --- | --- |
| | Before | After | |
| PEOX 200 | 4.0 | 1.5 | 0.4 |
| PEOX 500 | 4.0 | 2.6 | 1.1 |

EXAMPLE III

A first group of 60/40 ETFE/PEOX 500 films was formed according to the procedure of Ex. I (PEOX 500 replacing PEOX 200), except that the film was cast onto a fabric made of sulfonated woven PBI (Hoechst Celanese Corp. product E-176, a 32-ply 6.7 oz/yd$^2$ 2×1 twill PBI fabric). The fabric-cast film was calendered, extracted and dried as in Ex. I. Table III shows the thickness of the total film-fabric combination both before and after calendering, and the final Gurley number for the laminated fabric.

A second group of films of the same composition was cast on silicone release paper, calendered, and dried, as in Ex. I. The dry film was laid on the same type of sulfonated woven PBI fabric as was the first group. The film and fabric were sandwiched between layers of Kapton ™ film and the sandwich was calendered under the same conditions as the film in Ex. I. Table III shows the thickness of the film and the fabric before and after calendering, and the final Gurley number for the laminated fabric (measured as in Ex. I).

TABLE III

| | Thickness (mils) | | Gurley (sec) |
| --- | --- | --- | --- |
| | Before | After | |
| First group | 25.7 | 19 | 7.8 |
| | 25.7 | 19 | 8.7 |
| Second group | 10/18* | 16 | 0.6 |

TABLE III-continued

| | Thickness (mils) | | Gurley (sec) |
| --- | --- | --- | --- |
| | Before | After | |
| | 10/18 | 16 | 0.5 |
| | 10/20 | 20 | 26.5 |
| | 10/20 | 20 | 21.4 |

*Film thickness/fabric thickness.

EXAMPLE IV

Activated carbon was added to a 60/40 ETFE/PEOX 500 mixture prepared according to Ex. III in an amount that brought the ETFE/carbon ratio to 80/20; unlike Ex. III, however, the mixture had a solids content of about 20% to facilitate thorough emulsification and filtration. This carbon-containing mixture can provide about 2-3 ounces per yard of fabric if an ETFE layer about 6 mils thick is cast.

Three carbon-containing films were cast on silicone release paper, dried, calendered, and extracted as in Ex. I; a fourth carbon-containing film was cast on sulfonated woven PBI, dried, calendered, and extracted as in Ex. III.

Table IV indicates the film thickness before and after calendering and the Gurley number of the calendered films. For film 4, the final thickness includes both film and fabric and the Gurley measurement (performed according to Ex. I) applies to that laminated fabric.

TABLE IV

| Film | Thickness (mils) | | Gurley (sec) |
| --- | --- | --- | --- |
| | before | after | |
| 1 | 12.2 | 6.3 | 3.4 |
| 2 | 9.7 | 8.4 | 3.8 |
| 3 | 11.7 | 7.7 | 4.3 |
| 4 | 10.2 | 21.3* | 5.7 |

*Original fabric thickness was 19.3 mils.

EXAMPLE V

Four cast films containing ETFE/PEOX 200 in a 60/40 ratio were made according to the procedure of Ex. I. These films were first calendered and soaked in water to extract the binder, as in Ex. I, and then laminated onto fabrics using a polyamide adhesive web (Sharnet's SH-240 0.6 oz/yd$^2$ adhesive web). The adhesive was placed between the fabric and the film and heat was applied (about 125° C.) for about 20 seconds to create adhesive bonds. The films adhered very strongly to PBI and to cotton, but could be peeled off polyester and a 35/65 cotton/polyester blend. Table V shows the Gurley measurements of these four films before lamination, and of the subsequent laminated fabrics.

TABLE V

| Fabric | Gurley (sec) | |
| --- | --- | --- |
| | Before | After |
| Woven PBI | 0.7 | 0.9 |
| 100% Polyester | 1.9 | 2.4 |
| 100% Cotton | 1.0 | 1.7 |
| 65% Poly/35% Cotton | 1.0 | 1.7 |

Those skilled in the art will appreciate that many variations of the present invention are possible without departing from the spirit of the invention. The scope of the present invention is not limited to those embodiments illustrated or described above, but encompasses all the subject matter within the boundaries of the appended claims.

We claim:

1. A breathable fabric comprising a substrate fabric having a surface, and a microporous layer of poly bonded to said surface, wherein said microporous layer has mores which are substantially free of polymeric material.

2. A fabric according to claim 1 wherein said substrate fabric comprises poly[2,2'-(m-phenylene)-5,5'-bibenzimidazole], cotton, or blends thereof.

3. A fabric according to claim 1 wherein said fabric is water-resistant.

4. A fabric according to claim 1 wherein said fabric is fire resistant.

5. A fabric according to claim 1 wherein said microporous layer further comprises carbon particles.

* * * * *